United States Patent
Lee (10) Patent No.: US 11,784,327 B2
(45) Date of Patent: Oct. 10, 2023

(54) FUEL CELL COOLING SYSTEM FOR VEHICLE

(71) Applicants: Hyundai Motor Company, Seoul (KR); Kia Corporation, Seoul (KR)

(72) Inventor: Gang Woong Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/544,667

(22) Filed: Dec. 7, 2021

(65) Prior Publication Data

US 2022/0407089 A1    Dec. 22, 2022

(30) Foreign Application Priority Data

Jun. 17, 2021  (KR) .................. 10-2021-0078827

(51) Int. Cl.
*H01M 8/0267* (2016.01)
*H01M 8/0432* (2016.01)
*H01M 8/04746* (2016.01)

(52) U.S. Cl.
CPC ..... *H01M 8/0267* (2013.01); *H01M 8/04358* (2013.01); *H01M 8/04768* (2013.01); *H01M 2250/20* (2013.01)

(58) Field of Classification Search
CPC ........... H01M 8/0267; H01M 8/04358; H01M 8/04768

See application file for complete search history.

(56) References Cited

U.S. PATENT DOCUMENTS

| | | | |
|---|---|---|---|
| 2003/0148155 A1* | 8/2003 | Matthews | H01M 8/04029 429/430 |
| 2013/0065148 A1* | 3/2013 | Kim | F28D 1/0417 165/104.11 |
| 2018/0166711 A1* | 6/2018 | Kwon | H01M 8/04126 |
| 2020/0044264 A1* | 2/2020 | Koyama | H01M 8/04164 |
| 2022/0029176 A1* | 1/2022 | Rovik | H01M 8/04074 |
| 2022/0032726 A1* | 2/2022 | Nakagawa | H01M 8/04014 |

FOREIGN PATENT DOCUMENTS

| | | |
|---|---|---|
| KR | 10-2006-0069896 A | 6/2006 |
| KR | 10-2016-0026212 A | 3/2016 |

* cited by examiner

*Primary Examiner* — Stewart A Fraser
(74) *Attorney, Agent, or Firm* — MORGAN, LEWIS & BOCKIUS LLP (57) ABSTRACT

A fuel cell cooling system may include a fuel cell stack that produces electricity by use of a fuel, a fuel cell cooler that cools cooling water for cooling the fuel cell stack through exchange of heat with external air, an exhaust line that exhausts an exhaust gas generated by the fuel cell stack, a condenser fluidically connected to the exhaust line to generate condensate by condensing the exhaust gas and store the generated condensate, an ejector connected to the condenser to eject the condensate to an external surface of the fuel cell cooler, and a condensate cooler connected to the condenser to cool the condensate stored in the condenser through exchange of heat therebetween.

15 Claims, 7 Drawing Sheets

FIG.7

FUEL CELL COOLING SYSTEM FOR VEHICLE

CROSS-REFERENCE TO RELATED APPLICATION

The present application claims priority to Korean Patent Application No. 10-2021-0078827 filed on Jun. 17, 2021, the entire contents of which is incorporated herein for all purposes by this reference.

BACKGROUND OF THE INVENTION

Field of the Invention

The present invention relates to a fuel cell cooling system for a vehicle.

Description of Related Art

A fuel cell is a device that produces electric power by use of a fuel including hydrogen and a gas including oxygen. The electric power produced in the fuel cell may be stored in a battery which is an electricity storage device such as a secondary battery or a capacitor for stabilizing output.

Figure 1:
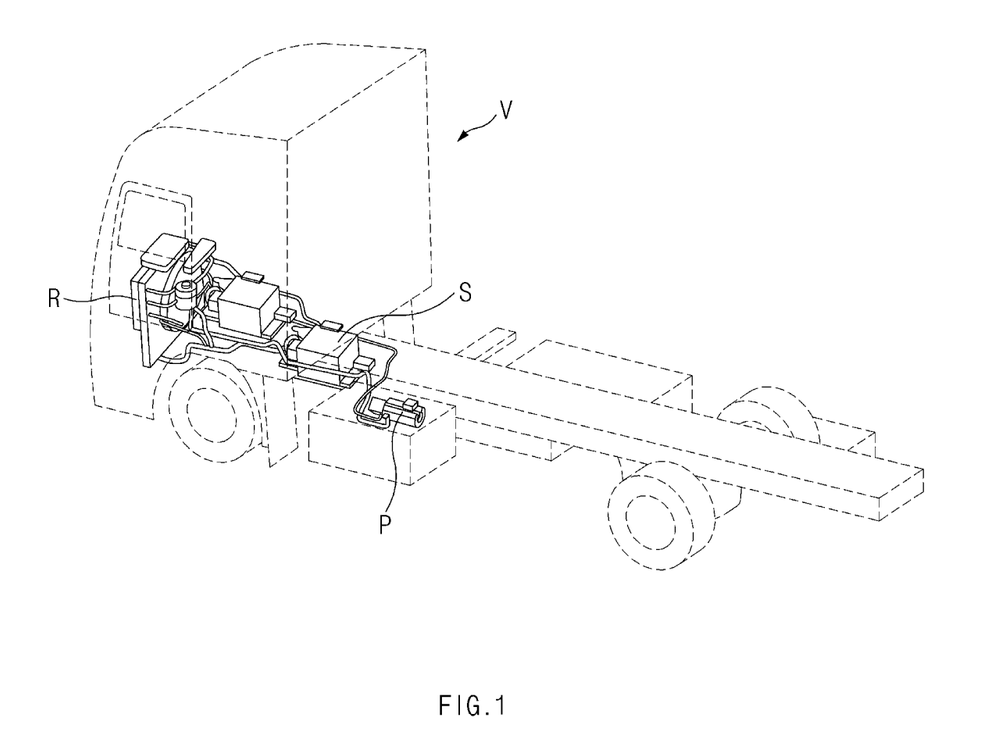
FIG. 1 is a view exemplarily illustrating an arrangement state of a fuel cell system for a vehicle.

The fuel cell and the battery may be used to drive a vehicle and may replace an internal combustion engine and a fossil fuel. FIG. 1 is a view illustrating an arrangement state of a general fuel cell system for a vehicle. As in FIG. 1, a fuel cell system may be disposed in and used for a cargo truck which is a kind of a vehicle "V". A radiator "R" of the fuel cell system may be disposed on a front surface of the vehicle "V", and a stack "S" and a heat pump "P" of the fuel cell system may be disposed below the driver's seat on a rear side of the radiator "R". Heat of the stack "S" may be discharged by the heat pump "P" and the radiator "R".

Even when the fuel cell system has the above-described heat radiating structure, all the heat is discharged through the radiator "R" consequently, and a limit temperature, at which cooling is made for stable driving, is about 85° C. Meanwhile, a vehicle including an internal combustion engine performs cooling by use of an intercooler and a radiator, and a limit temperature for stable driving is about 105° C. That is, when a vehicle is driven by use of a fuel cell system, a limit temperature disadvantageously is about 20° C., and an element that involves in cooling also is limited to one radiator due to the characteristics of the fuel cell, so that temperature may be abruptly increased because it is difficult to perform sufficient cooling.

The information disclosed in this Background of the Invention section is only for enhancement of understanding of the background of the invention and may not be taken as an acknowledgement or any form of suggestion that this information forms the prior art already known to a person skilled in the art.

BRIEF SUMMARY

Various aspects of the present invention are directed to providing a fuel cell cooling system having an improved cooling performance.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a fuel cell cooling system includes a fuel cell stack that produces electricity by use of a fuel, a fuel cell cooler that cools cooling water for cooling the fuel cell stack through exchange of heat with external air, an exhaust line that exhausts an exhaust gas generated by the fuel cell stack, a condenser fluidically connected to the exhaust line to generate condensate by condensing the exhaust gas and store the generated condensate, an ejector connected to the condenser to eject the condensate to an external surface of the fuel cell cooler, and a condensate cooler connected to the condenser to cool the condensate stored in the condenser through exchange of heat with the condenser.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Figure 2:
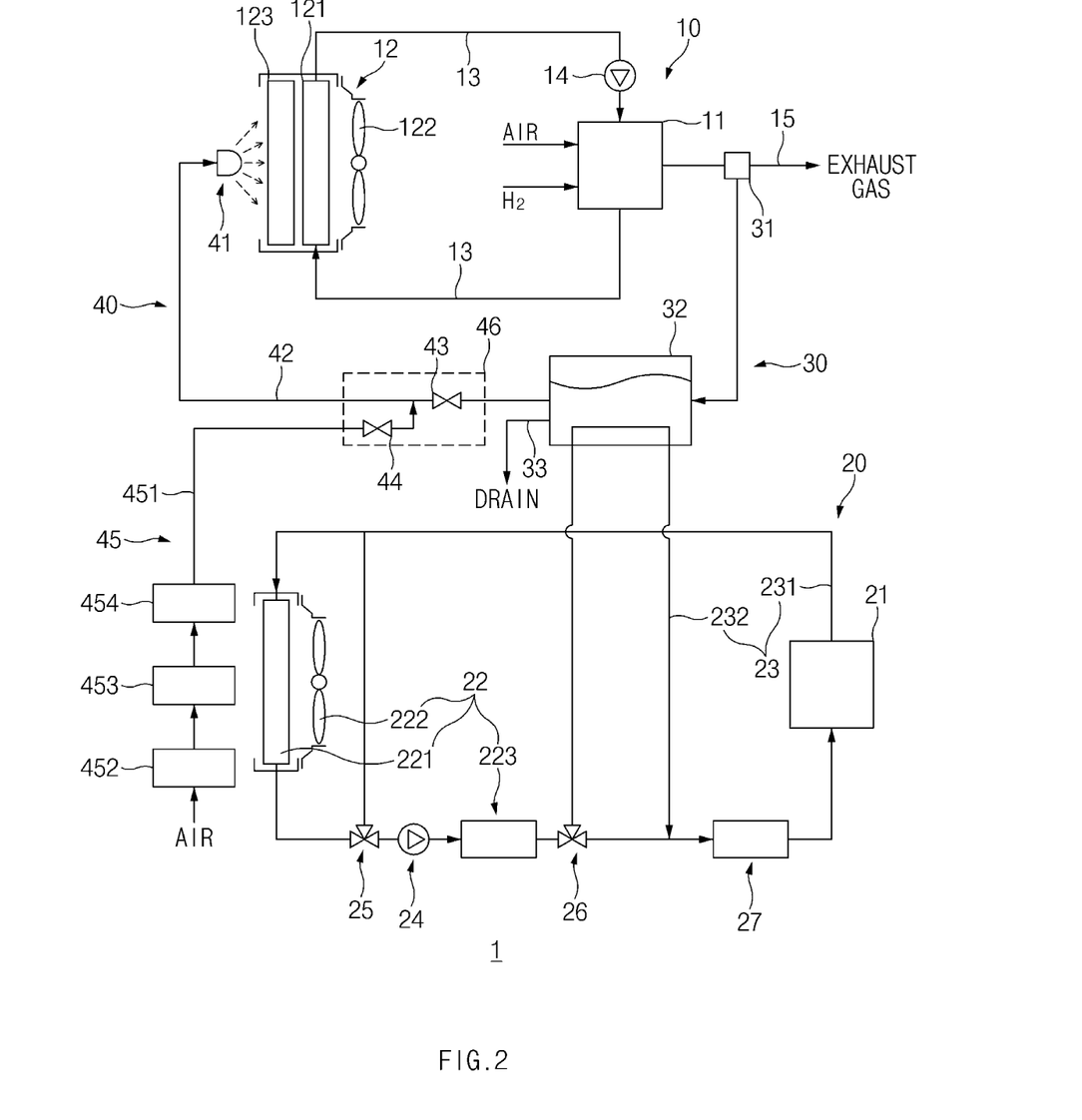
FIG. 2 is a conceptual view of a fuel cell cooling system according to various exemplary embodiments of the present invention.

FIG. 2 is a conceptual view of a fuel cell cooling system 1 according to various exemplary embodiments of the present invention.

Referring to the drawing, a fuel cell cooling system according to various exemplary embodiments of the present invention includes a fuel cell stack 11, a fuel cell cooler 12, an exhaust line 15, a condenser 30, an ejector 40, and a condensate cooler. The fuel cell cooling system may include a processor for controlling constituent elements. Because the fuel cell cooling system 1 according to the exemplary embodiment of the present invention provide additional heat exchange and cooling for the fuel cell cooler 12 with the configuration, a cooling performance of the fuel cell stack 11 may be improved without using a separate huge cooling facility.

The fuel cell cooling system 1 may include a fuel cell unit 10, and the fuel cell unit 10 may include the fuel cell stack 11, the fuel cell cooler 12, the exhaust line 15, and the condenser 30. The fuel cell unit 10 may include a cooling water passage 13 configured so that the cooling water flows between the fuel cell stack 11 and the fuel cell cooler 12 while circulating.

The fuel cell unit 10 may include a cooling water temperature acquirer disposed in the cooling water passage 13 and configured to acquire a temperature of the cooling water. The cooling water temperature acquirer may include a thermocouple or a thermistor for acquiring the temperature of the cooling water, and the kinds thereof are not limited thereto. The cooling water temperature acquirer may be electrically connected to the processor and may transmit the acquired temperature to the processor in a form of an electrical signal. The cooling water temperature acquirer may be located on a downstream side of the fuel cell cooler 12 and an upstream side of the fuel cell stack 11 along a flow direction of the cooling water and may acquire the temperature of the cooling water provided to the fuel cell stack 11.

The fuel cell unit 10 may include a fuel cell pump 14 configured to pump and feed the cooling water in the cooling water passage 13. The fuel cell pump 14 may be electrically connected to the processor to be controlled.

Fuel Cell Stack 11

The fuel cell stack 11 is configured to produce electric power by use of a fuel. The fuel used by the fuel cell stack 11 may include hydrogen. In the fuel cell stack 11, a plurality of fuel cells may be stacked. The fuel cell may have a membrane electrode assembly including a gas diffusion layer, a catalyst layer, and an electrolyte membrane, and the membrane electrode assembly may be surrounded by use of separators on opposite sides. The fuel including hydrogen may be provided to an anode of the fuel cell stack 11 and a gas including oxygen may be provided to a cathode thereof, and electric power may be produced by use of the fuel and the gas received by the fuel cell stack 11.

Although one fuel cell stack 11 is illustrated in the drawing, but a plurality of fuel cell stacks 11 may be provided. The plurality of fuel cell stacks 11 may be connected to each other in series or in parallel.

Fuel Cell Cooler 12

The fuel cell cooler 12 is configured to cool the cooling water for cooling the fuel cell stack 11 through exchange of heat with external air. Accordingly, the external air may be introduced into the fuel cell cooler 12, and the cooling water may pass through the fuel cell cooler 12.

The fuel cell cooler 12 may include a stack radiator 121 and a stack fan 122. The stack radiator 121 is an apparatus of cooling the cooling water through exchange of heat between the external air and the cooling water, and includes a plurality of pipelines, through which the cooling water flows, and the pipelines are spaced from each other so that the external air flows between and around the pipelines. The stack radiator 121 may be disposed on a front surface of the vehicle so that the external air may be easily delivered. The cooling water may be cooled as the external air of a relatively low temperature and the cooling water of a relatively high temperature exchange heat in the stack radiator 121.

The stack fan 122 is an apparatus of blowing the external air to a surrounding of the stack radiator 121, and forms flows of air through rotation thereof. As the stack fan 122 that faces the stack radiator 121 is rotated, the external air is accelerated and flows to the stack radiator 121, and the cooling water and the external air exchange heat in the stack radiator 121. The heat exchange rate in the stack radiator 121 may be increased by the stack fan 122, and as a rotation speed of the stack fan 122 is adjusted, a degree of the heat exchange occurring in the stack radiator 121 may be adjusted.

The fuel cell cooler 12 may include a component radiator 123 which is necessary to cool other electronic components used in the vehicle, except for the fuel cell. The component radiator 123 may be disposed together with the stack radiator 121, whereby the external air guided by the stack fan 122 and the cooling water may exchange heat.

Exhaust Line 15 and Condenser 30

The exhaust line 15 is a pipeline configured to exhaust the exhaust gas generated by the fuel cell stack 11. Accordingly, one end portion of the exhaust line 15 is connected to the fuel cell stack 11.

The condenser 30 may be disposed in the exhaust line 15, and may condense the exhaust gas that passes through the exhaust line 15 and generate and store condensate. Accordingly, as the exhaust gas that passes through the exhaust line 15 passes through the condenser 30, a humidity of the exhaust gas discharged through the exhaust line 15 may be remarkably reduced.

The condenser 30 may include a condensation unit 31 that generates the condensate from the exhaust gas. The condensation unit 31 may be formed in a form of a heat exchanger to condense the exhaust gas by cooling the exhaust gas, but a means for forming the condensate from the exhaust gas by the condensation unit 31 is not limited thereto and a gas/liquid separator and the like may be used as the condensation unit 31.

The condenser 30 may include a condensate tank 32. The condensate tank 32 is connected to the condensation unit 31 disposed in the exhaust line 15, and receives and stores the condensate generated through the condensation in the condensation unit 31.

The condenser 30 may include a condensate temperature acquirer. The condensate temperature acquirer may be disposed in the condensate tank 32, and may acquire a temperature of the stored condensate. The condensate temperature acquirer may include a thermocouple or a thermistor for acquiring the temperature of the condensate, and the kinds thereof are not limited thereto. The condensate temperature acquirer may be electrically connected to the processor and may transmit the acquired temperature to the processor in a form of an electrical signal.

The condenser 30 may include a condensate level acquirer. The condensate level acquirer may be disposed in the condensate tank 32, and may acquire a level of the stored condensate. The condensate level acquirer may be an ultrasonic sensor, a contact type level sensor, or a capacitive level sensor for acquiring the level of the condensate, but the kinds thereof are not limited thereto. The condensate level acquirer may be electrically connected to the processor and may transmit the acquired level to the processor in a form of an electrical signal.

The condenser 30 may include a drain pipeline 33. The drain pipeline 33 is configured to discharge the condensate from the condensate tank 32 to the outside. A drain valve may be disposed in the drain pipeline 33, and may determine whether the condensate is to be discharged through the drain pipeline 33 as the drain valve is opened and closed.

Ejector 40

The ejector 40 is connected to the condenser 30 to eject the condensate to an external surface of the fuel cell cooler 12. Because the ejector 40 includes a structure for ejection, and may include a condensate adjusting valve (water dosing valve (WDV)) 43 for pressurizing the condensate and an air adjusting valve (air purge valve (APV)) 44, and may include a nozzle 41 for discharging the condensate. The condensate adjusting valve 43 and the air adjusting valve 44 may be located in a dosing module 46.

The nozzle 41 is configured to eject the condensate to the stack radiator 121. The nozzle 41 may be disposed to face the stack radiator 121, and may be disposed at a location which is opposite to the stack fan 122 with respect to the stack radiator 121. A direction thereof, in which the nozzle 41 faces the stack radiator 121, may be the same as a direction thereof, in which the external air is guided to the stack radiator 121 by the stack fan 122. A plurality of nozzles 41 may be provided. The nozzle 41 may be formed in a form of a shower head having a plurality of holes for spraying small condensate droplets, but the kinds thereof are not limited thereto.

The condensate adjusting valve 43 is a valve for adjusting a flow rate of the condensate supplied to the nozzle 41, and the air adjusting valve 44 is a valve for adjusting a pressure, at which the condensate is ejected through the nozzle 41. The condensate adjusting valve 43 may be disposed in a condensate discharge line 42 which is a pipeline that receives the condensate from the condensate tank 32 and delivers the condensate to the nozzle 41, and an air line 451, to which compressed air is delivered, may be connected to an intermediate portion of the condensate discharge line 42. A location of the condensate discharge line 42, to which the air line 451 is connected, may be a location on a downstream side of the condensate adjusting valve 43 with respect to a flow direction of the condensate.

A check valve for preventing reverse flows of the condensate may be disposed on an upstream side of the condensate adjusting valve 43 along the flow direction of the condensate. The condensate adjusting valve 43 and the air adjusting valve 44 may be solenoid valves, opening amounts of which may be adjusted electrically, and may be electrically connected to the processor. As the opening amounts of the condensate adjusting valve 43 and the air adjusting valve 44 are adjusted, the flow rates of the condensate ejected thereby and ejection pressures of the condensate may be determined.

The ejector 40 may include an air preparer 45 that prepares air which is to be ejected through the nozzle 41. The air preparer 45 includes the air line 451. The air preparer 45 may include an air tank 453 disposed in the air line 451 and configured to store air. The air preparer 45 may include a compressor 452 configured to inject the air into the air tank 453 at a specific pressure.

The air preparer 45 may include an air pressure acquirer configured to acquire a pressure of the air stored in the air tank 453. The air pressure acquirer may be a pressure-resistive pressure sensor, a piezoelectric pressure sensor, a capacitive pressure sensor, and the like for acquiring the pressure of the air stored in the air preparer 45, and the kinds thereof are not limited thereto. The air pressure acquirer may be electrically connected to the processor and may transmit the acquired pressure to the processor in a form of an electrical signal.

The air preparer 45 may include a regulator 454 for preventing the pressure of the air provided to the air adjusting valve 44 from being excessively increased. Because the valve may be broken down or a large amount of condensate may be pumped out through the nozzle 41 as the air of an excessively high pressure is provided to the air adjusting valve 44, the air may be delivered to the air adjusting valve 44 by the regulator 454 at a relatively uniform pressure. The regulator 454 may include an orifice structure for reducing the pressure of the air and restricting the flow rate of the air.

With respect to the direction, in which the air flows along the air line 451, the elements, such as the compressor 452, the air tank 453, and the regulator 454, may be disposed in the sequence thereof. Furthermore, the air preparer 45 may include a surge tank for reducing noise between the compressor 452 and the air tank 453, a separator cooler that removes foreign substances by use of a centrifugal force and cools the air, and an air drier for removing moisture included in the compressed air.

Condensate Cooler

The condensate cooler is connected to the condenser 30 to cool the condensate stored in the condenser 30 through exchange of heat therebetween. The condensate cooler may be a battery unit 20 including a battery module 21, in which electric power is stored, in the exemplary embodiment of the present invention. However, the condensate cooler is not limited to the battery unit 20, and any apparatus which may cool the condensate stored in the condensate tank 32 will be sufficient.

The battery unit 20 may include the battery module 21 and a supply passage 23. The supply passage 23 may be formed so that the supply water that passes through the battery module 21 circulates along a closed circuit. The supply passage 23 may include a main passage 231, and a heat exchange passage 232 which is branched from the main passage 231 and merges to the main passage 231 again. The heat exchange passage 232 may pass through the condensate tank 32, and exchange heat between the condensate and the supply water to cool the condensate.

The battery module 21 is configured to store electric power, and the supply passage 23 is a passage configured so that the supply water provided for adjusting the temperature of the battery module 21 flows therethrough. The battery module store the electric power or may deliver the stored electric power to a site, at which the electric power is to be used, and may be charged. Accordingly, the battery module 21 may include a lithium polymer battery, a lithium mercury battery, and the like, which is a rechargeable secondary battery, but the kinds thereof are not limited thereto.

The heat exchange passage 232 which is a part of the supply passage 23 is connected to the condenser 30 so that the condensate and the supply water indirectly exchange heat. The heat exchange passage 232 may pass through the condensate tank 32. Accordingly, the condensate and the supply water may exchange heat through the heat exchange passage 232. A portion of the heat exchange passage 232, which passes through the condensate tank 32, has a form of a heat exchanger, and the supply water that flows through an interior of the heat exchange passage 232 and the condensate located on the outside may exchange heat.

The battery unit 20 may include a battery radiator 221 and a battery fan 222. The battery radiator 221 is disposed in the supply passage 23 to cool the supply water through exchange of heat with the external air. The battery fan 222 is disposed to blows the external air to a surrounding of the battery radiator 221. The operations of the battery fan 222 and the battery radiator 221 are similar to those described for the stack fan 122 and the stack radiator 121, and thus the description of the stack fan 122 and the stack radiator 121 may be applied to the battery fan 222 and the battery radiator 221.

The battery unit 20 may include a battery cooling device 223. The battery cooling device 223 may be disposed on a downstream side of a location, at which the battery radiator 221 is disposed in the supply passage 23, with respect to the flow direction of the supply water to cool the supply water through exchange of heat with a refrigerant. The supply water may be cooled by use of the battery cooling device 223 and the battery radiator 221. Because the battery cooling device 223 and the battery radiator 221 are used to cool the supply water, a battery cooling unit 22 may collectively include the battery cooling device 223, the battery radiator 221, and the battery fan 222.

The battery unit 20 may include a radiator valve 25. The radiator valve 25 is disposed in the supply passage 23 to determine whether the supply water is to flow through the battery radiator 221. The radiator valve 25 may be a three-way valve, and may allow the supply water to flow through the battery radiator 221 or prevent the supply water from being delivered to the battery radiator 221 as an opening amount thereof is adjusted. In the specification, the description that the radiator valve 25 is closed means that the supply water is not delivered to the battery radiator 221, and the description that the radiator valve 25 is opened means that the supply water may flow through the battery radiator 221.

The battery unit 20 may include a cooling valve 26. The cooling valve 26 is disposed in the supply passage 23 to determine whether the supply water is to flow through the heat exchange passage 232 which is a portion of the supply passage 23. The cooling valve 26 may a three-way valve, and may adjust an amount of the supply water that passes through the battery cooling device 223 and is provided to the heat exchange passage 232 as an opening amount thereof is adjusted. One end portion of the heat exchange passage 232 is connected to the cooling valve 26 and an opposite end portion of the heat exchange passage 232 is connected to a downstream side of a location on the main passage 231, at which the cooling valve 26 is disposed, whereby the supply water that passes through the battery cooling device 223 may be provide to the battery module 21 after being branched to the heat exchange passage 232 and the main passage 231 and merging. As the opening amount of the cooling valve 26 is adjusted, a ratio of the amounts of the supply water provided to the heat exchange passage 232 and the main passage 231 may be adjusted.

The radiator valve 25 and the cooling valve 26 may be solenoid valves, opening amounts of which may be electrically adjusted, and may be electrically connected to the processor to adjust the opening amounts under the control of the processor.

The battery unit 20 may include a battery pump 24 configured to pump and feed the supply water in the supply passage 23. The battery pump 24 may be electrically connected to the processor to be controlled.

The battery unit 20 may include a sheath heater 27 for heating the supply water flowing in the supply passage 23. This is because it is necessary not to cool but to heat the supply water when a temperature of the supply water is too low and an operation of the battery is not normally performed. To control operations of the heater and the cooling unit, a supply water temperature acquirer for acquiring the temperature of the supply water may be further disposed in the supply passage 23.

The battery cooling device 223 and the battery pump 24 may be disposed between the cooling valve 26 and the radiator valve 25, the sheath heater 27 may be disposed on a downstream side of a location, at which the heat exchange passage 232 is connected to the main passage 231, along the flow direction of the supply water through the supply passage 23, and the battery radiator 221 may be disposed on an upstream side of the radiator valve 25, but the present invention is not limited to the dispositions.

Processor

The fuel cell cooling system 1 according to the exemplary embodiment of the present invention may include the processor. The processor is electrically connected to the above-described elements to control the elements.

The processor is an element including devices which may perform logical operations for performing control commands and a micro controller unit (MCU), a central processing unit (CPU), a field programmable gate array (FPGA), an application specific integrated circuit (ASIC), and the like may be used as the processor, but the kinds thereof are not limited thereto.

The processor may be connected to the elements to transmit signals according to the control commands to the element, and may be connected to the sensors and the acquirers to receive the acquired information in a form of signals. Because the processor may be electrically connected to the elements, it may be connected to the elements by wire or may further include a communication module which may perform communication wirelessly for mutual communications.

The fuel cell cooling system 1 may further include a storage medium, and control commands performed by the processor may be stored in the storage medium to be utilized. The storage medium may be a device such as a hard disk drive (HDD), a solid state drive (SSD), a server, a volatile medium, or a nonvolatile medium, but the kinds thereof are not limited thereto. Furthermore, the storage medium may further store data which is necessary to allow the processor to perform an operation.

Figure 3:
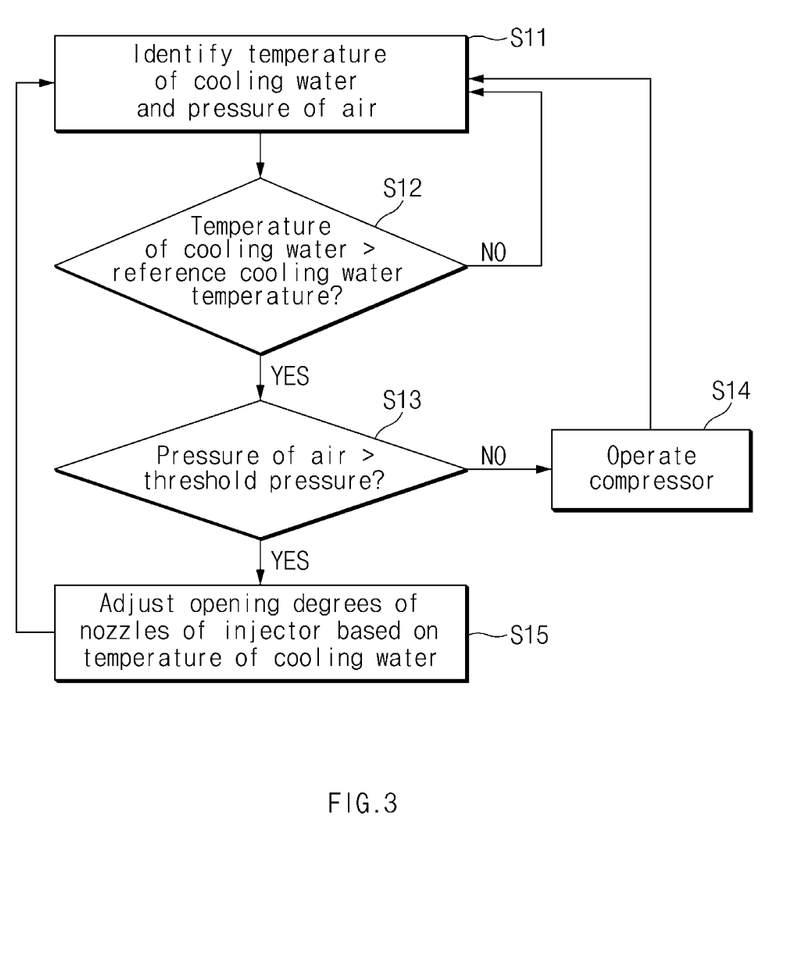
FIG. 3 is a flowchart illustrating a method for controlling an ejector according to a temperature of cooling water of a fuel cell cooling system according to various exemplary embodiments of the present invention.
Figure 4:
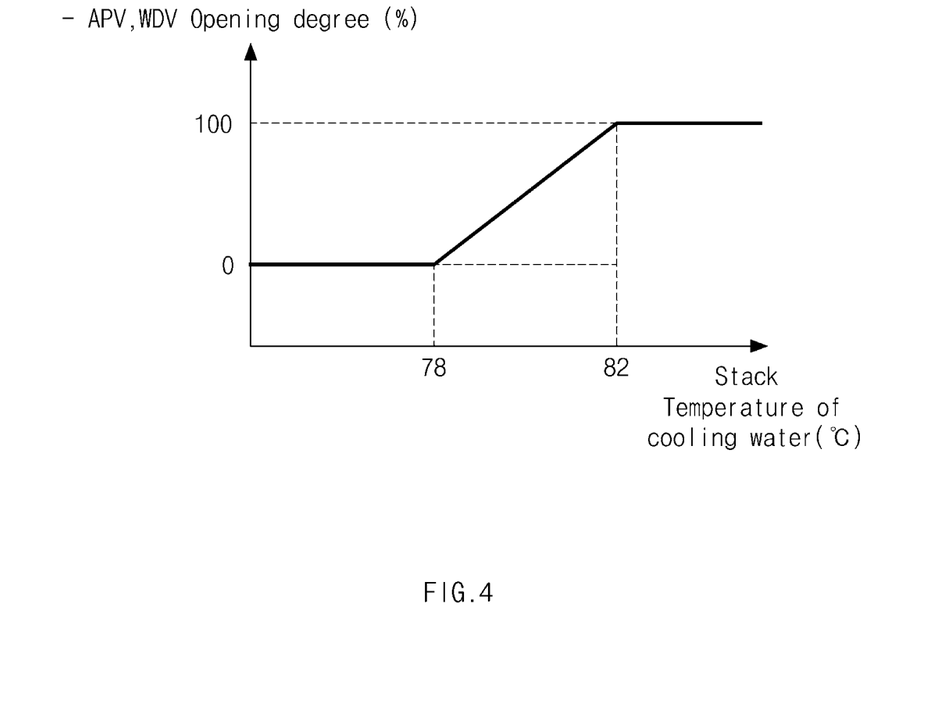
FIG. 4 is a graph depicting opening amounts of nozzles of an ejector according to a temperature of cooling water of a fuel cell cooling system according to various exemplary embodiments of the present invention.

FIG. 3 is a flowchart illustrating a method for controlling the ejector 40 according to a temperature of cooling water of the fuel cell cooling system 1 according to various exemplary embodiments of the present invention. FIG. 4 is a graph depicting opening amounts of the nozzles 41 of the ejector 40 according to a temperature of cooling water of the fuel cell cooling system 1 according to various exemplary embodiments of the present invention.

The processor may be electrically connected to the cooling water temperature acquirer, the air pressure acquirer, the condensate adjusting valve 43, and the air adjusting valve 44. The cooling water temperature acquirer may acquire a temperature of the cooling water that flows through the cooling water passage 13, and deliver the temperature to the processor. The air pressure acquirer may acquire a pressure of the air stored in the air tank 453 and deliver the acquired pressure to the processor (S11).

The processor may identify whether the acquired temperature of the cooling water is higher than a reference cooling water temperature (S12). For example, the reference cooling water temperature may be 78° C. Because the cooling water has a sufficiently low temperature when the acquired temperature of the cooling water is the reference cooling water temperature or less, additional cooling through ejection of the condensate is not necessary, and the operation returns to an operation (S11) of monitoring the temperature of the cooling water and the pressure of the air again without performing a separate control.

Because the cooling water does not have a sufficiently low temperature when the acquired temperature of the cooling water is higher than the reference cooling water temperature, additional cooling through the ejection of the condensate is necessary. In the instant case, to identify whether ejection of the condensate is prepared, it may be identified whether the pressure of the air in the air tank 453 is higher than a specific threshold pressure (S13). For example, the threshold pressure may be 6 bar. Because the acquired pressure of the air is not a pressure which is sufficient for the air to push the condensate when it is the threshold pressure or less, the processor may control the compressor 452 to be operated (S14).

Because the acquired pressure of the air is a pressure which is sufficient for the air to push the condensate when it is higher than the threshold pressure, the processor may control the ejector 40 to eject the air. The processor may adjust the opening amounts of the nozzles 41 of the ejector 40 based on the acquired temperature of the cooling water (S15). The processor, for example, may adjust the opening amounts of the condensate adjusting nozzle 41 and the air adjusting nozzle 41 based on the graph illustrated in FIG. 4. A stack cooling water temperature of the transverse axis of FIG. 4 represents the acquired temperature of the cooling water, and opening amounts of the APV and WDV of the longitudinal axis represents degrees, by which the condensate adjusting nozzle 41 and the air adjusting nozzle 41 are opened.

Figure 5:
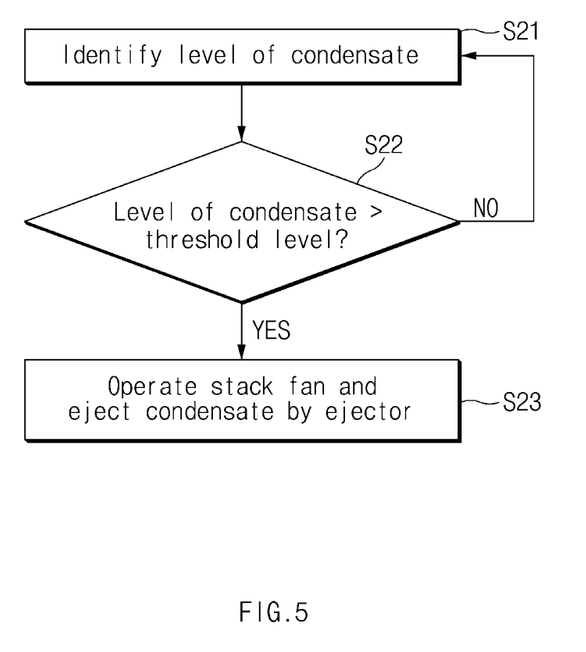
FIG. 5 is a flowchart illustrating a method for controlling an ejector according to a level of condensate of a fuel cell cooling system according to various exemplary embodiments of the present invention.

FIG. 5 is a flowchart illustrating a method for controlling the ejector 40 according to a level of condensate of the fuel cell cooling system 1 according to various exemplary embodiments of the present invention.

The processor may be electrically connected to the condenser 30, the ejector 40, and the stack fan 122. The condensate level acquirer may acquire a level of the condensate stored in the condensate tank 32 (S21). The processor may identify whether the acquired level of the condensate is higher than a specific threshold level (S22). Because there is a low danger of causing an accident, in which the condensate overflows from the condensate tank, when the acquired level of the condensate is the threshold level or less, a separate control is not necessary, and the processor may return to the operation (S21) of identifying the level of the condensate again.

However, because the condensate may overflow when the acquired level of the condensate is higher than the specific threshold level, it is necessary to consume the condensate. The processor may perform a control so that the ejector 40 and the stack fan 122 are operated when the level of the condensate acquired by the condensate level acquirer is higher than the threshold level (S23). Accordingly, because the condensate stored in the condensate tank 32 is ejected and used for cooling the cooling water, the level of the condensate becomes lower and thus a danger of causing overflow of the condensate may be reduced. Furthermore, in the same condition, the processor may lower the level of the condensate in a manner of opening the drain pipeline 33 by controlling the drain valve.

Figure 6:
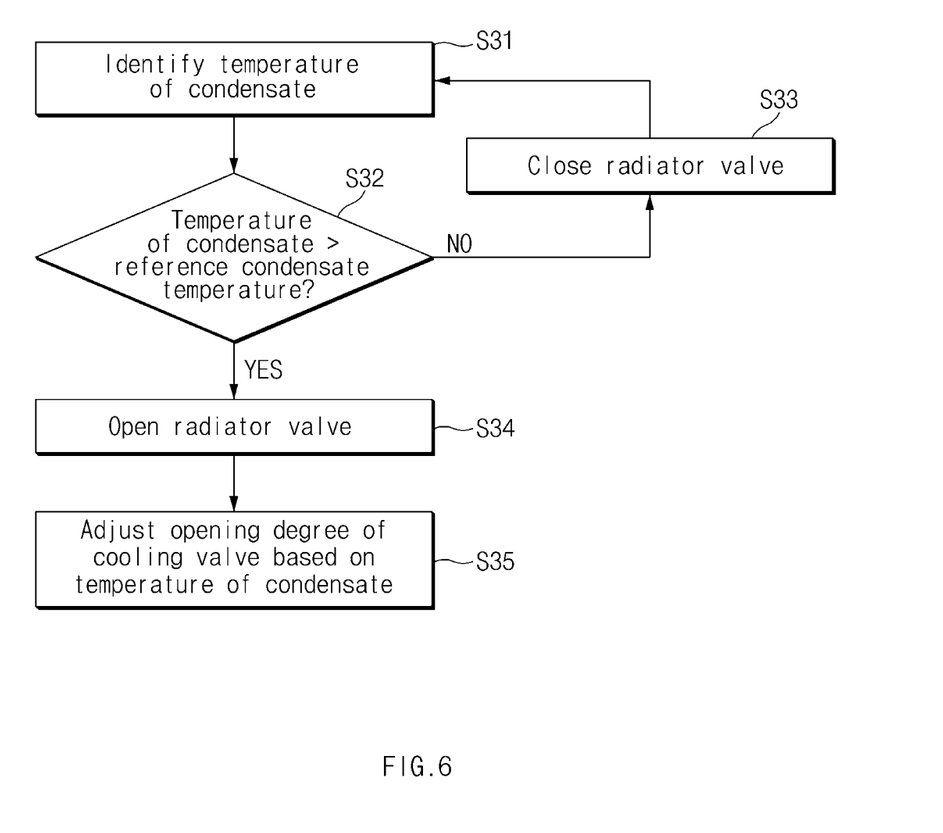
FIG. 6 is a flowchart illustrating a method for controlling a battery unit according to a temperature of condensate of a fuel cell cooling system according to various exemplary embodiments of the present invention.
Figure 7:
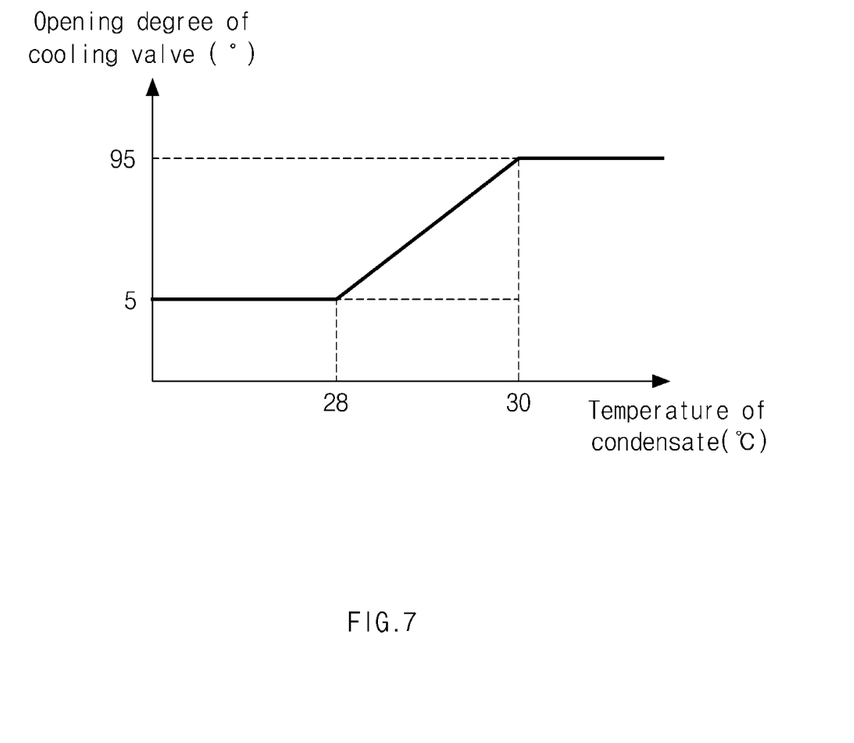
FIG. 7 is a graph depicting opening amounts of nozzles of a battery unit according to a temperature of condensate of a fuel cell cooling system according to various exemplary embodiments of the present invention.

FIG. 6 is a flowchart illustrating a method for controlling the battery unit 20 according to a temperature of condensate of the fuel cell cooling system 1 according to various exemplary embodiments of the present invention. FIG. 7 is a graph depicting opening amounts of the nozzles 41 of the battery unit 20 according to a temperature of condensate of the fuel cell cooling system 1 according to various exemplary embodiments of the present invention.

The processor may be electrically connected to the battery cooling device 223, the condensate temperature acquirer, the radiator valve 25, and the battery fan 222. The condensate temperature acquirer may acquire a temperature of the condensate stored in the condensate tank 32 (S31). The processor may identify whether the temperature of the condensate acquired by the condensate temperature acquirer is higher than a specific reference condensate temperature (S32). The reference condensate temperature may be 28° C.

The condensate may sufficiently lower the temperature of the cooling water without separate cooing when the acquired temperature of the condensate is the reference condensate temperature or less. Accordingly, in the instant case, the radiator valve 25 may maintain a closed state so that the supply water may not be cooled by the battery radiator 221 or the like (S33).

Because the condensate may sufficiently lower the temperature of the cooling water only with separate cooling when the acquired temperature of the condensate is higher than the reference condensate temperature, it is necessary to cool the condensate with the supply water. Accordingly, in the instant case, the processor may open the radiator valve 25 (S34). At the same time, the processor may operate the battery fan 222 so that the battery radiator 221 involves in the cooling of the supply water, and may control the battery cooling device 223 to start an operation.

The processor may adjust the opening amount of the cooling valve 26 based on the temperature of the condensate acquired by the condensate temperature acquirer in a situation in which the battery radiator 221 involves in the cooling (S35). The processor, for example, may adjust the opening amount of the cooling valve 26 based on the graph illustrated in FIG. 7. The transverse axis of FIG. 7 represents the acquired temperature of the condensate, and the longitudinal axis of FIG. 7 represents an opening amount of the cooling valve 26, which is expressed by an angle. As the opening amount of the cooling valve 26 becomes smaller, the amount of the supply water delivered to the heat exchange passage 232 is reduced.

Accordingly, because a cooling performance of a fuel cell system may be improved without separately providing a cooling system of a large size, cooling performance may be improved without modifying an existing vehicle in a large scale.

Although it may have been described until now that all the elements forming the exemplary embodiments of the present invention are coupled to one or coupled to be operated, the present invention is not essentially limited to the embodiments. That is, without departing from the purpose of the present invention, all the elements may be selectively coupled into one or more elements to be operated. Furthermore, because the terms, such as "comprising", "including", or "having" may mean that the corresponding element may be included unless there is a specially contradictory description, it should be construed that another element is not excluded but may be further included. Furthermore, unless defined otherwise, all terms used herein, including technical or scientific terms, have the same meanings as those generally understood by those skilled in the art to which various exemplary embodiments of the present invention pertains. The terms, such as the terms defined in dictionaries, which are generally used, should be construed to coincide with the context meanings of the related technologies, and are not construed as ideal or excessively formal meanings unless explicitly defined in various exemplary embodiments of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A fuel cell cooling system comprising:
   a fuel cell stack configured to produce electricity by use of a fuel;
   a fuel cell cooler fluidically connected to the fuel cell stack and configured to cool cooling water for cooling the fuel cell stack through exchange of heat with external air;
   an exhaust line connected to the fuel cell stack and configured to exhaust an exhaust gas generated by the fuel cell stack;
   a condenser fluidically connected to the exhaust line to generate condensate by condensing the exhaust gas and to store the generated condensate;
   an ejector connected to the condenser to eject the condensate to an external surface of the fuel cell cooler; and
   a condensate cooler connected to the condenser to cool the condensate stored in the condenser through exchange of heat therebetween,
   wherein the condensate cooler includes a battery unit including a battery module configured to store electric power, and a supply passage, through which supply water provided to adjust a temperature of the battery module flows,
   wherein the condenser includes a condensate tank configured to store the condensate, and
   wherein a heat exchange passage which is a portion of the supply passage is connected to the condensate tank so that the condensate and the supply water indirectly exchange heat.

2. The fuel cell cooling system of claim 1, wherein the battery unit includes:
   a battery radiator disposed in the supply passage to cool the supply water through exchange of heat with the external air;
   a battery fan configured to blow the external air to a surrounding of the battery radiator;
   a battery cooling device disposed on a downstream side of a location, at which the battery radiator is disposed in the supply passage, with respect to a flow direction of the supply water to cool the supply water through exchange of heat with a refrigerant;
   a radiator valve disposed in the supply passage to selectively control a flow of the supply water through the battery radiator; and
   a cooling valve disposed in the supply passage to selectively open the heat exchange passage to flow the supply water therethrough.

3. The fuel cell cooling system of claim 2, wherein the condenser further includes:
   a condensate temperature acquirer configured to acquire a temperature of the stored condensate,
   wherein the fuel cell cooling system further includes a processor electrically connected to the condensate temperature acquirer and the battery unit to control the radiator valve and the battery fan.

4. The fuel cell cooling system of claim 3, wherein the processor is configured to open the radiator valve and operate the battery fan when the temperature of the condensate, which is acquired by the condensate temperature acquirer, is higher than a reference condensate temperature.

5. The fuel cell cooling system of claim 4, wherein the processor is configured to adjust an opening amount of the cooling valve according to the temperature of the condensate, which is acquired by the condensate temperature acquirer, in a situation in which the battery radiator involves in cooling.

6. The fuel cell cooling system of claim 1, wherein the fuel cell cooler includes:
   a stack radiator fluidically connected to the fuel cell stack and configured to cool the cooling water through exchange of heat between the external air and the cooling water; and
   a stack fan configured to blow the external air to a surrounding of the stack radiator.

7. The fuel cell cooling system of claim 6, wherein the ejector includes:
   a nozzle configured to eject the generated condensate to the stack radiator.

8. The fuel cell cooling system of claim 7, wherein the ejector further includes:
   a condensate adjusting valve configured to adjust a flow rate of the generated condensate supplied to the nozzle; and
   an air adjusting valve configured to adjust a pressure, at which the generated condensate is ejected through the nozzle.

9. The fuel cell cooling system of claim 8, wherein the ejector further includes:
   an air tank connected to the air adjusting valve and configured to store air;
   a compressor configured to inject the air into the air tank at a predetermined pressure; and
   an air pressure acquirer configured to acquire a pressure of the air stored in the air tank,
   wherein the fuel cell cooling system further includes a processor electrically connected to the compressor and the air pressure acquirer, and
   wherein the processor is configured to control the compressor so that the compressor is operated when the pressure of the air, which is acquired by the air pressure acquirer, is a predetermined threshold pressure or lower than the predetermined threshold pressure.

10. The fuel cell cooling system of claim 9, further including:
    a cooling water temperature acquirer configured to acquire a temperature of the cooling water; and
    a processor electrically connected to the condensate adjusting valve, the air adjusting valve and the cooling water temperature acquirer,
    wherein the processor is configured to adjust opening amounts of the condensate adjusting valve and the air adjusting valve according to the temperature of the cooling water, which is acquired by the cooling water temperature acquirer.

11. The fuel cell cooling system of claim 6,
    wherein the fuel cell cooler further includes a component radiator disposed adjacent to the stack radiator, and
    wherein the nozzle is configured to eject the generated condensate to the component radiator.

12. The fuel cell cooling system of claim 1, wherein the condenser includes:
    a condensate tank configured to store the condensate; and
    a drain pipeline connected to the condensate tank and configured to discharge the condensate from the condensate tank to an outside.

13. The fuel cell cooling system of claim 12, further including a condensation unit mounted to the exhaust line, wherein the condensate tank is connected to the condensation unit.

14. A fuel cell cooling system comprising:
    a fuel cell stack configured to produce electricity by use of a fuel;
    a fuel cell cooler fluidically connected to the fuel cell stack and configured to cool cooling water for cooling the fuel cell stack through exchange of heat with external air;
    an exhaust line connected to the fuel cell stack and configured to exhaust an exhaust gas generated by the fuel cell stack;
    a condenser fluidically connected to the exhaust line to generate condensate by condensing the exhaust gas and to store the generated condensate;
    an ejector connected to the condenser to eject the condensate to an external surface of the fuel cell cooler; and
    a condensate cooler connected to the condenser to cool the condensate stored in the condenser through exchange of heat therebetween,
    wherein the fuel cell cooler includes:
       a stack radiator fluidically connected to the fuel cell stack and configured to cool the cooling water through exchange of heat between the external air and the cooling water; and
       a stack fan configured to blow the external air to a surrounding of the stack radiator,
    wherein the ejector includes:
       a nozzle configured to eject the generated condensate to the stack radiator; and
       an air preparer configured to prepare air which is to be ejected through the nozzle,
    wherein the air preparer includes:
       an air tank configured to store air;
       a compressor configured to inject the air into the air tank at a predetermined pressure; and
       an air pressure acquirer configured to acquire a pressure of the air stored in the air tank,
    wherein the fuel cell cooling system further includes a processor electrically connected to the ejector and the air preparer, and
    wherein the processor is configured to control the compressor so that the compressor is operated when the pressure of the air, which is acquired by the air pressure acquirer, is a predetermined threshold pressure or lower than the predetermined threshold pressure.

15. A fuel cell cooling system comprising:
    a fuel cell stack configured to produce electricity by use of a fuel;
    a fuel cell cooler fluidically connected to the fuel cell stack and configured to cool cooling water for cooling the fuel cell stack through exchange of heat with external air;
    an exhaust line connected to the fuel cell stack and configured to exhaust an exhaust gas generated by the fuel cell stack;
    a condenser fluidically connected to the exhaust line to generate condensate by condensing the exhaust gas and to store the generated condensate;
    an ejector connected to the condenser to eject the condensate to an external surface of the fuel cell cooler; and
    a condensate cooler connected to the condenser to cool the condensate stored in the condenser through exchange of heat therebetween,
    wherein the fuel cell cooler includes:
       a stack radiator fluidically connected to the fuel cell stack and configured to cool the cooling water through exchange of heat between the external air and the cooling water; and a stack fan configured to blow the external air to a surrounding of the stack radiator, wherein the condenser further includes:
a condensate level acquirer configured to acquire a level of the stored condensate, wherein the fuel cell cooling system further includes a processor electrically connected to the ejector and the condensate level acquirer, and wherein the processor is configured to control the ejector and the stack fan so that the ejector and the stack fan are operated when the level of the condensate, which is acquired by the condensate level acquirer is higher than a threshold level.

* * * * *